US006974238B2

(12) United States Patent
Sturt et al.

(10) Patent No.: US 6,974,238 B2
(45) Date of Patent: Dec. 13, 2005

(54) TRIM COMPONENT WITH MOUNTED LIGHT SOURCE FOR INDIRECTLY LIGHTING THE INTERIOR OF A VEHICLE

(75) Inventors: Alan Sturt, West Bloomfield, MI (US); Henry Hsu, Southfield, MI (US); Lisa Tucci, St. Heights, MI (US); Michael J. Berta, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/256,253

(22) Filed: Sep. 26, 2002

(65) Prior Publication Data

US 2004/0062054 A1     Apr. 1, 2004

(51) Int. Cl.[7] ............................................... B60Q 3/02
(52) U.S. Cl. ...................... 362/488; 362/501; 362/511; 362/545; 257/89
(58) Field of Search ............................... 257/89, 98, 99; 362/488, 489, 495, 800, 501, 511, 545

(56) References Cited

U.S. PATENT DOCUMENTS

| 4,670,819 A | * | 6/1987 | Boerema et al. ............ 362/501 |
| 4,823,239 A | | 4/1989 | Doty |
| 4,882,842 A | * | 11/1989 | Basson et al. ................. 29/857 |
| 5,136,483 A | * | 8/1992 | Schoniger et al. ........... 362/545 |
| 5,143,437 A | | 9/1992 | Matsuno et al. |
| 5,149,186 A | | 9/1992 | Matsuno et al. |
| 5,149,187 A | | 9/1992 | Matsuno et al. |
| 5,151,850 A | | 9/1992 | Matsuno et al. |
| 5,194,854 A | | 3/1993 | Havel |
| 5,226,711 A | | 7/1993 | Matsuno et al. |
| 5,558,425 A | | 9/1996 | Pons et al. |
| 5,599,086 A | | 2/1997 | Dutta |
| 5,647,657 A | | 7/1997 | Damasky et al. |
| 5,677,603 A | | 10/1997 | Speirs et al. |
| 5,938,321 A | | 8/1999 | Bos et al. |
| 6,000,822 A | | 12/1999 | Polizzi et al. |
| 6,043,735 A | * | 3/2000 | Barrett ......................... 340/436 |
| RE36,642 E | | 4/2000 | Ziadi |
| 6,092,917 A | | 7/2000 | Litke et al. |
| 6,179,453 B1 | | 1/2001 | McMahon |
| 6,231,111 B1 | | 5/2001 | Carter et al. |
| 6,238,075 B1 | | 5/2001 | Dealey, Jr. et al. |
| 6,244,734 B1 | | 6/2001 | Hulse |
| 6,273,499 B1 | | 8/2001 | Guyon |
| 6,594,417 B1 | * | 7/2003 | Hulse .............................. 385/31 |
| 6,641,276 B1 | * | 11/2003 | Macher et al. ................. 362/84 |
| 2001/0002169 A1 | | 5/2001 | Reitze et al. |
| 2001/0022730 A1 | | 9/2001 | Nagata et al. |

* cited by examiner

Primary Examiner—Stephen W. Smoot
(74) Attorney, Agent, or Firm—MacMillan, Sobanski & Todd, LLC

(57) ABSTRACT

An interior trim component for a vehicle includes a main body having an exterior surface for facing the interior of the vehicle. The body defines an internal cavity formed therein and an opening in the exterior surface. The cavity and the opening are in communication with each other. A source of light is mounted in the cavity such that the source of light is hidden from direct normal viewing within the interior of the vehicle.

14 Claims, 3 Drawing Sheets

TRIM COMPONENT WITH MOUNTED LIGHT SOURCE FOR INDIRECTLY LIGHTING THE INTERIOR OF A VEHICLE

BACKGROUND OF THE INVENTION

This invention relates in general to interior trim components for vehicles, and in particular to a trim component having a source of light mounted therein.

Most passenger vehicles include sources of light for providing overhead lighting to the interior of the vehicle. It has been known to use various light sources, such as incandescent bulbs, neon light tubes, and light emitting diodes (LEDs). The light source is typically mounted within a light assembly on the roof or headliner of the vehicle interior. A light beam is emitted from the light source in a downwardly direction towards the interior of the vehicle. The light beam is emitted directly through a generally plastic or glass lens. Although this arrangement provides adequate light to the interior of the vehicle, the light beam is often too bright. It is sometimes desirable to only dimly light the interior of the vehicle. This type of dim or ambient lighting is nearly impossible with overhead light fixtures.

It is also sometimes cumbersome and time consuming to install the light assembly. Often, the light assembly is to be attached to the headliner or another trim component of the vehicle. The light assembly and the headliner or trim component are first manufactured and then separately shipped to the vehicle assembly plant. The headliner or trim component is then installed into the interior of the vehicle. After installation of the headliner or tram component, an installer must generally crawl back into the interior of the vehicle and attach the light fixture to the headliner or the trim component. Alternatively, sometimes the light fixture is first installed into the vehicle, and then subsequently the headliner or trim component is installed into the vehicle.

BRIEF SUMMARY OF THE INVENTION

This invention relates to an interior trim component for a vehicle. The trim component includes a main body having an exterior surface for facing the interior of the vehicle. The body defines an internal cavity formed therein and an opening in the exterior surface. The cavity and the opening are in communication with each other. A source of light is mounted in the cavity such that the source of light is hidden from direct normal viewing within the interior of the vehicle.

The invention also relates to an improved method of assembling a portion of a vehicle, wherein an interior trim component is first manufactured to include a main body having an exterior surface for facing the interior of the vehicle. The body defines an internal cavity formed therein and an opening in the exterior surface which is in communication with the cavity. A source of light is mounted in the cavity to form a trim assembly such that the source of light can be emitted from the openings. The trim assembly is then transported to a vehicle assembly plant where the trim assembly is installed as a single unit into an interior of a vehicle.

Various objects and advantages of this invention will become apparent to those skilled in the art from the following detailed description of the preferred embodiment, when read in light of the accompanying drawings.

DETAILED DESCRIPTION OF THE INVENTION

Figure 1:
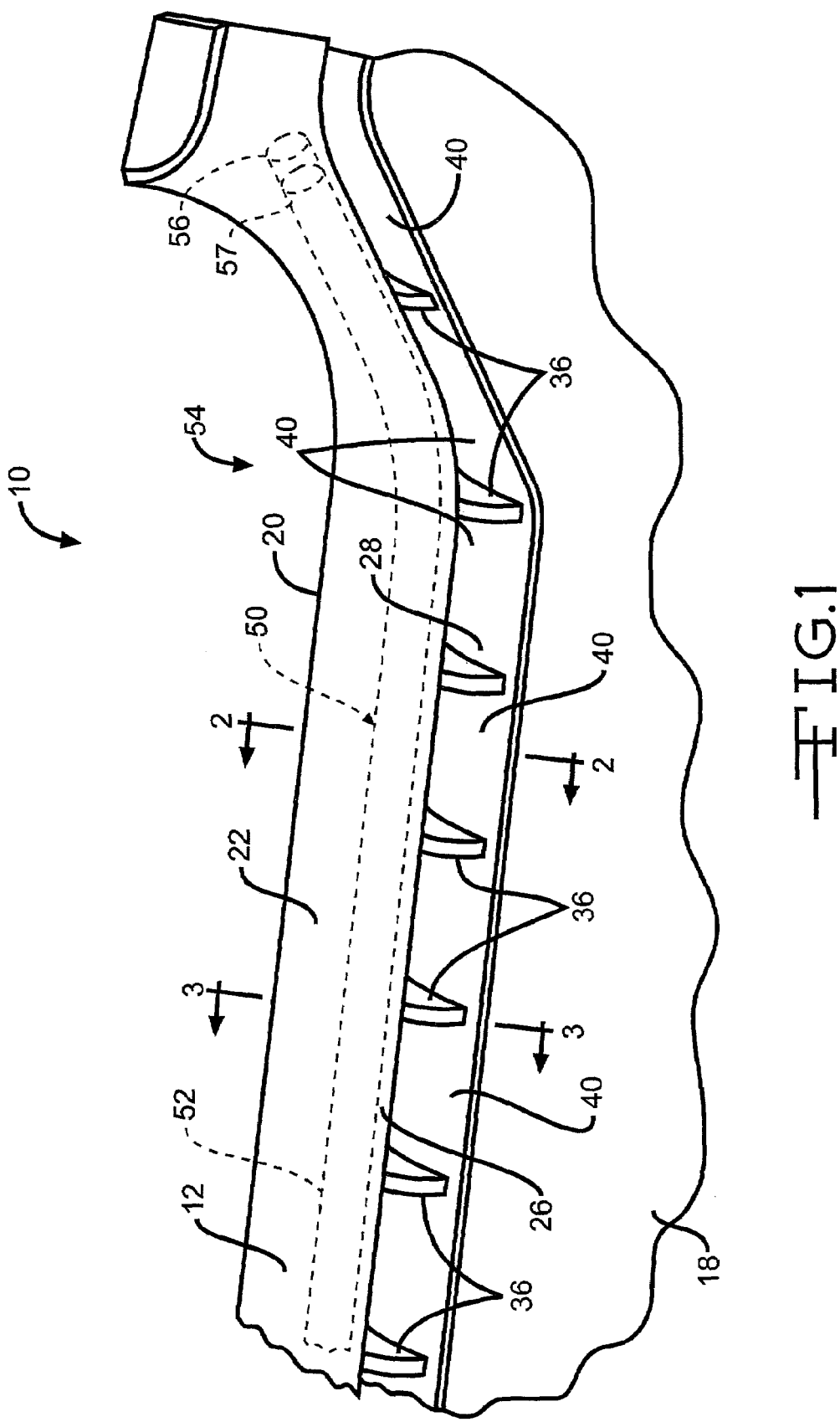
FIG. 1 is a perspective view of a trim component having an integrally mounted light source, in accordance with the present invention.

Referring now to the drawings, there is illustrated in FIG. 1, a trim component, indicated generally at 10, in accordance with the present invention. The trim component 10 has an exterior surface 12 which faces the interior of the vehicle in which the trim component 10 is installed. The exterior surface 12 preferably includes an aesthetically pleasing texture and color. The trim component 10 can be made of any suitable material, such as plastic, and can be made by any suitable method, such as by an injection molding operation.

Figure 2:
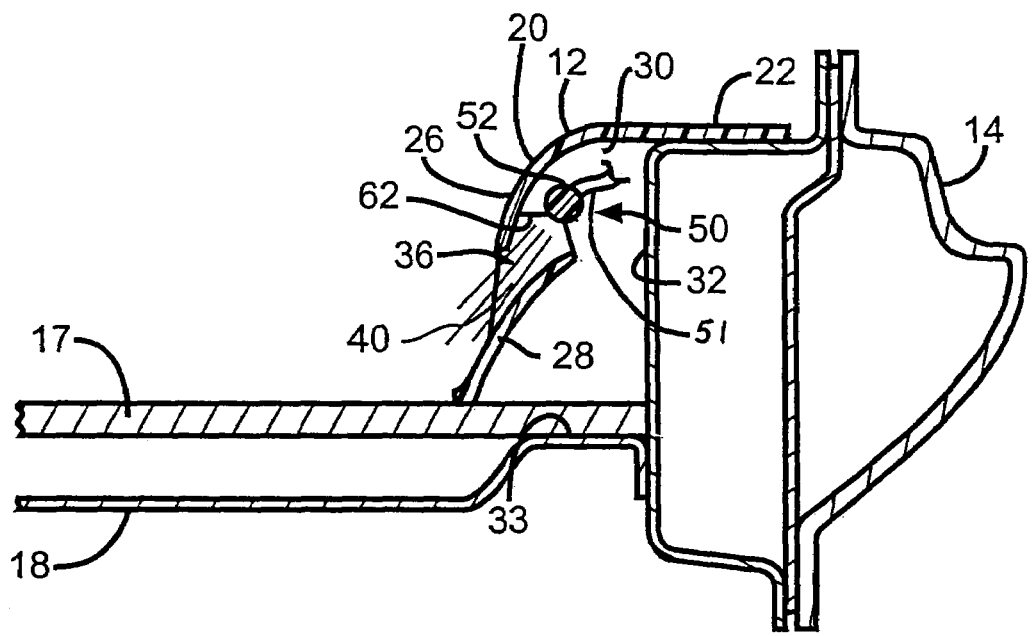
FIG. 2 is a cross-sectional view taken along lines 2—2 of FIG. 1.
Figure 3:
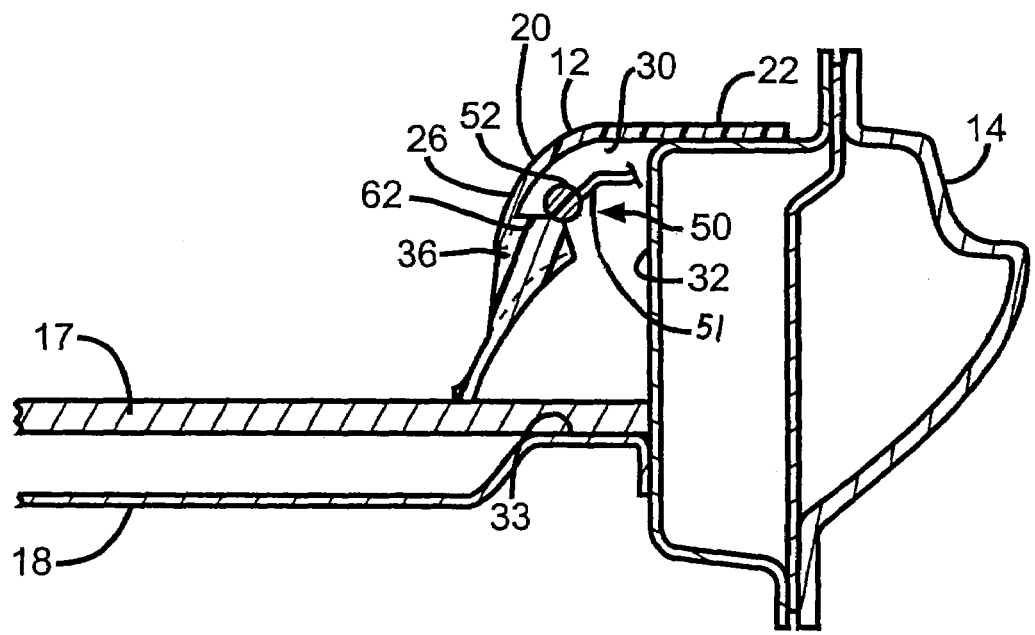
FIG. 3 is a cross-sectional view taken along lines 3—3 of FIG. 1.

The trim component 10 can be any suitable panel or trim piece which covers frame members or other components of the vehicle. For example, the trim component 10 can be a portion of the instrument panel, a kick panel, a door panel mounted on the interior wall of a door, a panel mounted on the side walls of the frame of the vehicle, or a portion of the roof assembly or headliner. In the preferred embodiment of the trim component 10 illustrated in FIGS. 1 through 3, the trim component 10 covers a door sill 14 of a vehicle frame, indicated generally at 16. The sill 14 is generally formed from three separate shaped panels attached together. Generally, the frame 16 includes a generally horizontal floor 18 of the vehicle. A carpet layer 17 is positioned above the floor 16. The sill 14 is a generally hollow portion positioned on the outboard edge of the floor and extends longitudinally relative to the vehicle. A vehicle door (not shown) is generally mounted above the sill 14. The trim component 10 may have a complimentary shape as the exterior shape of the sill 14. The trim component 10 is elongated and generally conforms to the length and shape of the sill 14.

The trim component 10 includes an elongated body portion 20 having an upper panel 22 disposed above the upper surface of the sill 14. The body portion 20 further includes an upper curved wall portion 26 extending generally downwardly from the left-hand end of the upper panel 22. A lower curved wall portion 28 extends along the length of the body portion 20. The body portion 20 can be made of a single integral structure or can be formed by the attachment of multiple structures. The curved wall portions 26 and 28 and the upper panel 22 generally define an open cavity 30 which is generally hidden from direct viewing by an occupant within the interior of the vehicle. The cavity 30 is further defined by a vertical wall 32 of the sill 14 and outboard portion 33 of the floor 18.

The trim component 10 preferably further includes a plurality of integral vanes 36 extending between the upper curved wall portion 26 and the lower curved wall portion 28. The vanes 36 are preferably relatively thin planar sections which extend in a direction normal to the length of the body portion 20 as shown in FIG. 1. The vanes 36 provide support and attachment of the lower curved wall portion 28 to the upper curved wall portion 26. Although the embodiment of the trim component 10 is shown as having the vanes 36 extend in direction normal to the length of the body portion 20, its should be understood that the vanes 36 can extend at any direction different from the axis defined by the elongated body portion 20.

The vanes 36, the upper curved wall portion 26, and the lower curved wall portion 28 define a plurality of spaced apart openings 40 in the inboard side of the trim component 10. The inboard side of the trim component 10 faces the interior of the vehicle. The openings 40 are in communication with the interior cavity 30.

The trim component 10 further includes a source of light, indicated schematically at 50. The source of light 50 is mounted within the cavity 30 of the trim component 10. The source of light 50 includes an electrical harness 51 which provides an electrical path from a source of electrical power (not shown), such as the vehicle battery or electrical system, to the source of light.

The source of light 50 emits a beam of light through the openings 40. This beam of light is directed onto the floor 18 of the vehicle. Preferably, the source of light 50 is positioned within the cavity such that the source of light 50 is hidden from view. This hidden configuration assures that the source of light 50 is not in a direct normal view of sight from passengers within the interior of the vehicle, thereby creating an ambient lighting effect. The phrase "normal view of sight" or "direct normal viewing" as used herein refers to the line of sight of a passenger in their normal seated position. The ambient lighting provides an indirect source of light into the vehicle interior without a beam of light dazzling or shinning brightly in the eyes of the passengers of the vehicle.

The source of light 50 can be any suitable light emitting device which can emit a light from within the cavity 30 and out through the openings 40 of the trim component 10. Examples of suitable light emitting devices include incandescent bulbs, fluorescent bulbs, neon light tubes, and light emitting diodes (LEDs). Preferably, the source of light 50 is an elongated member extending along the length of the body portion 20 within the cavity 40. More preferably, the elongated source of light 50 emits a generally continuous beam of light along the length thereof to provide a relatively continuous beam of light along the length of the cavity 30. Note that the vanes 36 may obstruct or deflect the light s the beam of light is directed on the floor 18.

Once such suitable elongated source of light 50 can include an elongated light guide 52 made of a translucent material. The light guide 52 can be flexible to conform to the shape of the cavity 40, such as shown in FIG. 1, wherein the cavity 40 and the light guide 52 bend about a region, indicated generally at 54. A light emitting diode 56 is attached to one or both of the ends of the light guide 52. The light emitting diode 56 when excited emits a beam of light an end 57 of the translucent light guide 52. The beam of light travels through the light guide 52 and is directed radially outwardly along the length of the light guide 52 and through the openings 40. The light emitting diode includes a semiconductor diode that converts electric energy into electromagnetic radiation at visible and near-infrared wavelengths by electroluminescence at a forward-biased pn junction. Some non-limiting examples of semiconductor materials used in light emitting diodes are gallium arsenide (GaAs), gallium arsenide phosphide (GaAsP), gallium phosphide (GaP), and gallium nitride (GaN). The type of semiconductor material used generally determines the wavelength of the radiated light and thus, the color. For example, GaAsP produces either red or yellow light, and GaP produces either yellow or green light. The light emitting diode 56 can be equipped with multiple diodes with different semiconductor materials to emit multiple colors, either separately or simultaneously. For example, the light emitting diode can be a bicolor or tricolor light emitting diode. Alternatively, a light tube having a first colored bulb (e.g., a red bulb) on one end and a second colored bulb (e.g., a white bulb) on the other end which emit light to a common reflective surface can be used instead of a bicolor (e.g., red and white) LED.

Preferably, the light guide 52 is mounted within the cavity 30 by attachment to an upper portion 62 of the vanes 36. Thus, the vanes 36 may also provide a convenient mounting location for the source of light 50. The light guide 52 can be attached to the vanes 36 by any suitable manner, and may include clips (not shown) for attachment thereof.

The trim component 10 can be assembled together with the source of light 50 prior to being installed into the vehicle. This method of installation is an improvement over conventional methods in which a lighting fixture is attached to a portion of the vehicle in the vehicle assembly plant after a trim component has been previously mounted. In a preferred method of assembling a portion of the vehicle, the trim component 10 is first manufactured in a manufacturing plant such that the source of light 50 is mounted in the cavity 30 to form a trim assembly. The trim assembly can then be transported to a vehicle assembly plant. The trim assembly is then installed into the interior of the vehicle. For example, for the embodiment of the trim component 10 illustrated in FIGS. 1 through 3, the trim component 10 is mounted and attached to the sill 14. The electrical harness 51 is then connected to another electrical harness (not shown) to complete the electrical path from the source of light to a source of electrical power.

Figure 4:
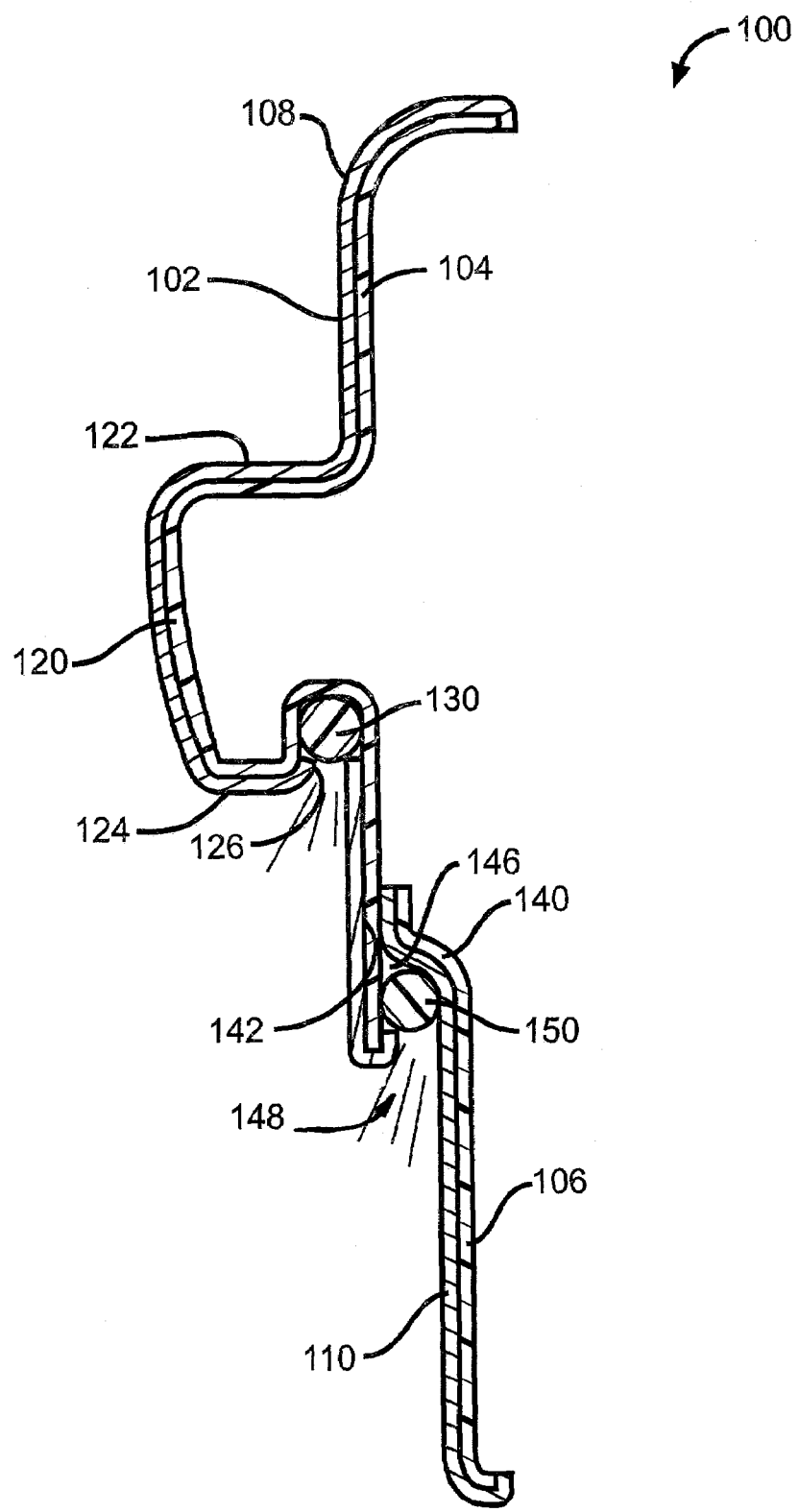
FIG. 4 is a cross-sectional view of door trim panel having an integrally mounted light source, in accordance with the present invention.

There is illustrated in FIG. 4, another trim component formed as a door panel, indicated generally at 100. The door panel 100 is adapted for covering a vehicle door (not shown) positioned at the right-hand side thereof, as viewing FIG. 4. The door panel 100 includes an exterior face 102 which faces the interior of the vehicle. The exterior surface 102 preferably includes an aesthetically pleasing texture and color. The door panel may be made of any suitable material, such as plastic, and generally includes an upper panel 104 and a lower panel 106. The upper panel 104 may be covered with an optional trim material 108, such as leather or vinyl, defining the exterior surface 102. Similarly, the lower panel 106 may be covered with a trim material 110.

The upper panel 104 includes an armrest portion 120 having an upper generally horizontally extending surface 122. The armrest portion further includes a lower portion 124 having an upwardly extending recess 126 formed therein. The recess 126 defines an internal cavity and an opening. A source of light, such as an elongated light guide 130 is disposed in the recess 126. The recess 126 and light guide 130 are generally hidden from direct viewing by an occupant within the interior of the vehicle.

The lower panel 106 includes an upper portion 140 which is overlapped and connected to a lower portion 142 of the upper panel 104 to form a cavity 146 and an opening 148 which are generally hidden from direct viewing by an occupant within the interior of the vehicle. A source of light, such as an elongated light guide 150 is disposed in the cavity 146. If desired, the upper panel 104 and the lower panel 106 can be formed into a single integral part.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An interior trim component for a vehicle comprising:
a main body having an exterior surface for facing the interior of the vehicle, said body defining an internal cavity farmed therein and an opening in said exterior surface in communication with said cavity; and
a source of light mounted in said cavity such that said source of light is hidden from direct normal viewing within the interior of the vehicle and such that said source of light emits light through said opening so that said light is directed at the floor of the vehicle;
wherein said interior trim component is a sill panel far covering a sill frame of a vehicle.

2. The trim component of claim 1, wherein said source of light is a fluorescent bulb.

3. The trim component of claim 1, wherein said source of light is a neon light tube.

4. The trim component of claim 1, wherein said source of light is a light emitting diode.

5. The trim component of claim 1, wherein said source of light includes a linear light guide made of a translucent material.

6. The trim component of claim 5, wherein said source of light further includes at least one light emitting diode attached to one end of said light guide for emitting light through said light guide.

7. The trim component of claim 1, wherein said source of light is a multicolored light emitting diode capable of altering the color of the light emitted therefrom.

8. An interior trim component for a vehicle comprising:
a main body having an exterior surface for facing the interior of the vehicle, said body defining an internal cavity formed therein and an opening in said exterior surface in communication with said cavity; and
a source of light mounted in said cavity such that said source of light is hidden from direct normal viewing within the interior of the vehicle, wherein said cavity is elongated and defines a first axis, and wherein said body includes a plurality of vanes extending in a direction different from said first axis, such that said plurality of vanes form a plurality of spaced apart openings.

9. The trim component of claim 8, wherein said plurality of vanes extend in a direction normal to the first axis.

10. The trim component of claim 8, wherein said source of light is emitted from an elongated member mounted on said plurality of vanes.

11. The trim component of claim 8, wherein said source of light is a light emitting diode.

12. The trim component of claim 8, wherein said source of light includes a linear light guide made of a translucent material.

13. The trim component of claim 12, wherein said source of light further includes at least one light emitting diode attached to one end of said light guide for emitting light through said light guide.

14. The trim component of claim 8, wherein said source of light is a multicolored light emitting diode capable of altering the color of the light emitted therefrom.

* * * * *

UNITED STATES PATENT AND TRADEMARK OFFICE
CERTIFICATE OF CORRECTION

PATENT NO.    : 6,974,238 B2                                                           Page 1 of 1
DATED         : December 13, 2005
INVENTOR(S)   : Alan Sturt et al.

It is certified that error appears in the above-identified patent and that said Letters Patent is hereby corrected as shown below:

Column 5,
Line 5, delete "farmed" and insert -- formed --;
Line 12, delete "far" and insert -- for --.

Signed and Sealed this

Twenty-first Day of February, 2006

JON W. DUDAS
*Director of the United States Patent and Trademark Office*